United States Patent
Jeromin et al.

(10) Patent No.: US 11,958,436 B2
(45) Date of Patent: Apr. 16, 2024

(54) SEATBELT INTERLOCK

(71) Applicant: Rivian IP Holdings, LLC, Irvine, CA (US)

(72) Inventors: Oliver Jeromin, Bloomfield Hills, MI (US); Henning Wigger, Detroit, MI (US); Vismay Aggarwal, Lake Forest, CA (US); Efren Cabebe, Costa Mesa, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 85 days.

(21) Appl. No.: 17/848,085

(22) Filed: Jun. 23, 2022

(65) Prior Publication Data
US 2023/0415698 A1   Dec. 28, 2023

(51) Int. Cl.
*B60R 22/48* (2006.01)

(52) U.S. Cl.
CPC ...... *B60R 22/48* (2013.01); *B60R 2022/4816* (2013.01); *B60R 2022/485* (2013.01); *B60R 2022/4858* (2013.01); *B60R 2022/4866* (2013.01)

(58) Field of Classification Search
CPC .............. B60R 22/48; B60R 2022/485; B60R 2022/4866
See application file for complete search history.

(56) References Cited

U.S. PATENT DOCUMENTS

| | | | |
|---|---|---|---|
| 9,415,746 B1* | 8/2016 | Johnson | G06V 20/593 |
| 2018/0126949 A1* | 5/2018 | Turnwald | B60R 22/48 |
| 2021/0138999 A1* | 5/2021 | Thomas | G06V 20/59 |
| 2021/0347323 A1* | 11/2021 | Thomas | B60R 21/01538 |
| 2022/0063554 A1* | 3/2022 | Thomas | B60R 25/102 |

OTHER PUBLICATIONS

"Driver's and Front Passenger's Seat-Belt Reminder System (All)", Honda Information Center, archived at https://web.archive.org/web/20210924123955/https://www.hondainfocenter.com/Shared-Technologies/Safety/Drivers-and-Front-Passengers-Seat-Belt-Reminder-System-All/ (archived on Sep. 24, 2021), 1 page.

* cited by examiner

*Primary Examiner* — Long T Tran
(74) *Attorney, Agent, or Firm* — Haley Guiliano LLP

(57) ABSTRACT

Example illustrations herein are directed to systems and methods for determining whether a vehicle driver meets a seat belt criteria based upon a detection of each of a set of seat belt conditions. In an example, the set of conditions includes at least the vehicle driver occupying a driver seat of the vehicle, expiration of a minimum delay time after the vehicle driver is occupying the driver seat, and an engagement of a driver's seat belt latch with a corresponding buckle after the expiration of the minimum delay time, and a positioning of a driver's seat belt on a shoulder of the vehicle driver. The method may also include enabling a first vehicle feature if the vehicle driver meets the seat belt criteria. The first vehicle feature may be disabled if the vehicle driver does not meet the seat belt criteria.

20 Claims, 5 Drawing Sheets

SEATBELT INTERLOCK

INTRODUCTION

The present disclosure is directed to a seatbelt, and more particularly to an interlock system for a seatbelt in a vehicle.

SUMMARY

At least some example illustrations herein are directed to a method that includes determining whether a vehicle driver has occupied a driver seat of a vehicle. The method may also include enabling a first vehicle feature upon determining that a seat belt criteria is met. The determination whether the seat belt criteria is met may be made based upon a detection of each of a set of seat belt conditions. In an example, the set of conditions includes an expiration of a first time after the vehicle driver occupies the driver seat, an engagement of a driver's seat belt latch with a corresponding buckle after the expiration of the first time, and a positioning of a driver's seat belt on a shoulder of the vehicle driver.

At least some example illustrations herein are directed to a method that includes determining whether a vehicle driver has occupied a driver seat of a vehicle. The method may also include deactivating a notification upon determining that a seat belt criteria is met. The determination whether the seat belt criteria is met may be made based upon a detection of each of a set of seat belt conditions. In an example, the set of conditions includes an expiration of a first time after the vehicle driver occupies the driver seat, an engagement of a driver's seat belt latch with a corresponding buckle after the expiration of the first time, and a positioning of a driver's seat belt on a shoulder of the vehicle driver. The notification may persist if the vehicle driver does not meet the seat belt criteria.

At least some example illustrations herein are directed to a vehicle system that includes a driver seat occupancy sensor, a driver seat belt engagement sensor, a driver seat belt shoulder position sensor, and a controller in communication with the driver seat occupancy sensor, the driver seat belt engagement sensor, and the driver seat belt shoulder position sensor. The controller is configured to determine whether a vehicle driver meets a seat belt criteria based upon a detection of each of a set of seat belt conditions. The set of conditions includes the driver seat occupancy sensor detecting the vehicle driver occupying a driver seat of the vehicle, expiration of a minimum delay time after the vehicle driver is occupying the driver seat, the driver seat belt shoulder position sensor detecting an engagement of a driver's seat belt latch with a corresponding buckle after the expiration of the minimum delay time, and the driver seat belt shoulder position sensor detecting a positioning of a driver's seat belt on a shoulder of the vehicle driver. The controller is configured to enable a first vehicle feature if the vehicle driver meets the seat belt criteria. The controller is configured to disable the first vehicle feature if the vehicle driver does not meet the seat belt criteria.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

Figure 1:
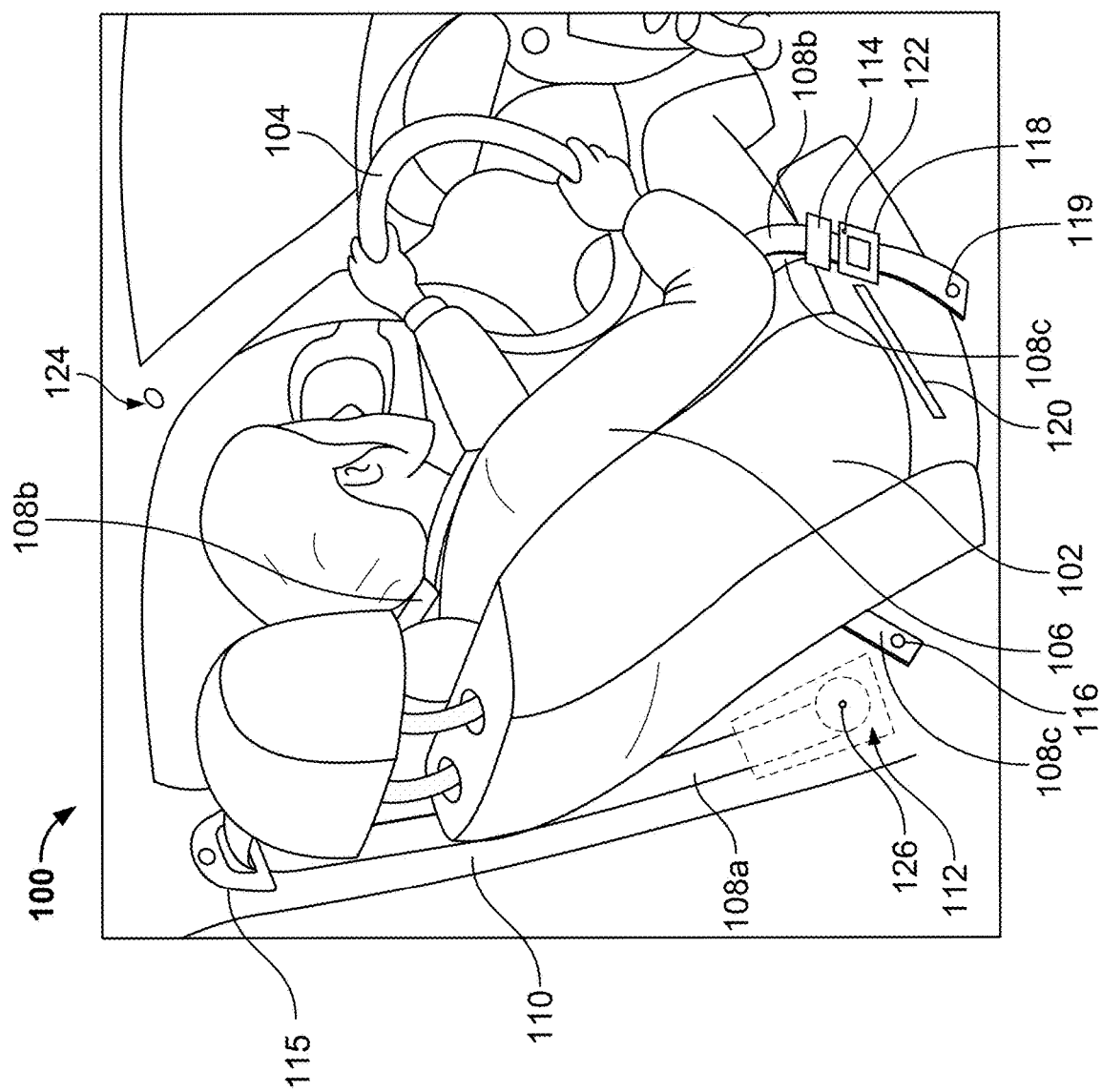
FIG. 1 shows a perspective view of an illustrative vehicle interior, in accordance with some embodiments of the present disclosure.

Generally, vehicles have encouraged seat belt usage with reminders and warnings. Seat belt usage may be of particular importance to vehicle fleet operators, e.g., commercial vehicle fleets. In some known systems, seat belt reminders or warnings provide an audible and/or visible indicator to encourage drivers and/or passengers in a vehicle to buckle their respective seat belts. Known systems typically include a warning/reminder that is displayed until a seat belt is buckled, as determined by a buckle sensor. While these systems have encouraged greater seat belt usage, it is possible for them to be defeated, e.g., by leaving the seatbelt latched in the buckle with the belt extending behind the driver/passenger.

Accordingly, example illustrations herein are directed to systems and methods that enforces vehicle seat belt usage more robustly. In at least some examples, one or more sensors may determine whether a driver seat belt is engaged based upon multiple conditions detected by the sensor(s). The system/vehicle may determine that the driver has properly engaged their seat belt upon satisfaction of each of the multiple conditions. In response to the detection of the seat belt being engaged, example systems and methods may enable a vehicle feature. The vehicle feature may include, for example, the deactivation of a warning or reminder, e.g., to engage a seat belt. In other examples, the vehicle feature may be a lock or other device preventing or inhibiting vehicle operation, e.g., an interlock on a vehicle shift lever, or the like.

Example illustrations may employ a set of conditions to be used in determining that a driver has properly engaged their seat belt. In some examples, the set of conditions includes (a) an occupant being positioned in the driver seat, (b) engagement of the seat belt buckle, and (c) placement of the seat belt on a shoulder area of the driver. In some example approaches, additional conditions to the three set forth above may be employed in determining whether/when a vehicle seat belt is engaged, such as payout of a driver seat belt.

The satisfaction of conditions used to determine whether/when a vehicle seat belt is engaged may be detected by one or more sensors of a vehicle. For example, an occupant detection sensor may be provided to determine that a driver is sitting in a driver's seat of the vehicle, e.g., using weight sensors, cameras, or any other type of sensor that is convenient for determining that the driver's seat of the vehicle is occupied. The vehicle sensors may also include a buckle switch configured to detect engagement of a driver seat belt with a buckle. In one example, the buckle switch detects insertion and/or engagement of a seat belt tongue in/with the buckle. The vehicle sensor(s) may also include a camera positioned to detect placement of shoulder belt webbing of the driver seat belt on the driver's shoulder. In an example, a camera is positioned in a forwardmost pillar structure of the vehicle, i.e., the vehicle "A-pillar," and is configured to view an area of the seat where the seat belt should be placed over the driver/occupant's shoulder when properly worn. To the extent a vehicle system/method relies at least in part upon seat belt payout as a factor in determining that the driver's seat belt is properly engaged, the vehicle sensors may also include a payout sensor, e.g., in the seat belt retractor, that is configured to detect an amount of seat belt webbing that has been paid out from the seatbelt retractor.

In at least some example illustrations, one or more vehicle sensors may detect a set of conditions to determine whether a driver seat belt is buckled, including a timing requirement for the occurrence of at least one of the conditions. In an example, at least one of the conditions must occur within a predetermined time period of another of the conditions. Additionally, in at least some example approaches a set of conditions may be satisfied only if one or more of the conditions are satisfied in a particular order. As will be explained in further detail below, these example methods and systems may be relatively robust at determining that a driver seat belt has been properly buckled, while also being resistant to being overcome. By contrast, previous approaches employing a buckle sensor may be defeated, e.g., by the driver buckling the seat belt behind the driver. Accordingly, example illustrations herein may rely upon a combination of sensor outputs that needs to happen in a predetermined sequence in order to activate a vehicle feature, e.g., to deactivate an otherwise persistent warning, to allow operating of the vehicle, or to notify a fleet operator, merely as examples.

Turning now to FIG. 1, an example vehicle interior is illustrated and described in further detail. The vehicle 100 may include a driver seat 102 positioned in front of a steering wheel 104 of the vehicle 100. A driver 106 occupies the driver seat 102 and is positioned to drive the vehicle 100. A seat belt 108 is provided, and is shown restraining the driver 106, e.g., in the event of a forward collision of the vehicle 100. More particularly, the seat belt 108 is shown deployed with a first portion 108a extending from a retractor 112 and upwards along the pillar structure 110 to a D-ring structure 115. The D-ring structure 115 is pivotally secured to the pillar structure 110, and the seat belt 108 extends through the D-ring 115 such that a second portion 106b extends across a shoulder of the driver 106 to a buckle 114. The buckle 114 is retained in a catch 118, which is securely retained to vehicle structure via an anchor 119. The seat belt 108 extends through the buckle 114 and back to a second anchor 116 at/adjacent the pillar structure 110, such that a third portion 108c of the seat belt is positioned over the lap of the driver 106. Accordingly, the seat belt 108 has a "three-point" configuration. The seat belt 108 may be partially drawn into the retractor 112 when unbuckled. The retractor 112 thus may take in unused portion(s) of the seat belt 108 and facilitate proper positioning of the seat belt 108 for various size/height drivers.

As noted above, the vehicle 100 may have one or more sensors configured to detect conditions relating to proper securement of the seat belt 108 with respect to the driver 106. A seat occupancy detector may be provided, e.g., in the form of a sensor, camera, or the like that is configured to determine when the driver 106 is sitting upon the seat 102. In one example of a seat occupancy detector, a weight sensor 120 is provided in a bottom portion of the seat 102, which is configured to determine occupancy of the seat 102 based upon weight applied to the seat 102. A driver seat belt engagement sensor may be configured to determine when the seat belt 108 is latched. In one example, a driver seat belt engagement sensor is a buckle sensor 122 configured to sense whether/when the buckle 114 is positively retained within the catch 118. A driver seat belt position sensor may also be provided that is configured to detect placement of the seat belt 108 upon a shoulder of the driver 106. In one example, the seat belt position sensor is a camera 124 positioned along an upper headliner or forward pillar structure of the vehicle 100. The camera 124 may have an area of the seat 102 in view where the seat belt 108 will appear over the shoulder of the driver 106 when properly worn. The camera 124 may identify the seat belt 108, e.g., by a color of the belt or other visual identifier on the seat belt 108. Accordingly, were the seat belt 108 not in the field of view of the camera 124, e.g., due to not being buckled or being buckled behind the driver 106, the camera 124 may identify that the seat belt 108 is obstructed by the driver 106. A determination of whether seat belt 108 is positioned over the shoulder or torso of driver 106 may also be accomplished using other methods, either as an alternative or in addition to those described above using camera 124. Merely as examples, a computer vision pattern recognition or machine learning technique may be employed. As will be discussed further below, in some example illustrations a belt payout sensor 126 is provided for detecting a distance the seat belt 108 is deployed from the retractor 112 relative to a baseline position. For example, the belt payout sensor 126 may be positioned within the retractor 112, e.g., adjacent or within a belt spool, to detect movement or distance traveled of the seat belt 108 from an initial position.

While this particular example includes separate sensors for the seat occupancy detector 120, seat belt engagement sensor 122, the seat belt position sensor 124, and the belt payout sensor 126, it should be understood that in some example approaches a single sensor may be configured to detect driver occupancy of the seat, buckling of the seat belt, positioning of the seat belt on a shoulder of the driver, and a distance the seat belt is paid out from the retractor 112. Merely as one example, a camera may be configured to determine each of these factors, such as camera 124.

Figure 2:
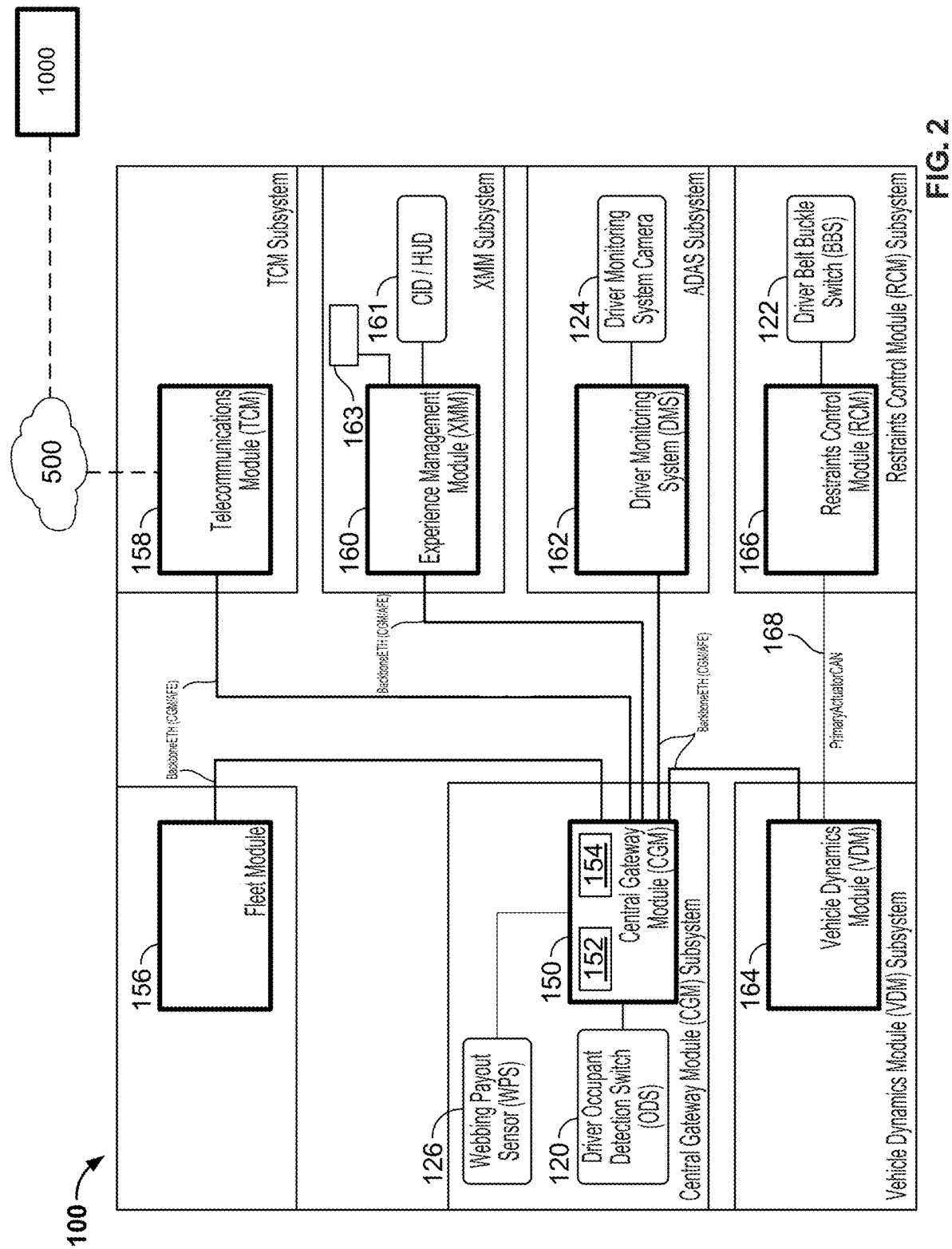
FIG. 2 shows a schematic view of a vehicle seat belt system, in accordance with some embodiments of the present disclosure.

Referring now to FIG. 2, a schematic illustration of vehicle 100 is illustrated and described in further detail. The vehicle 100 may include a central gateway module 150 comprising a processor 152 and a memory 154. The memory 154 may be any computer-readable storage medium or the like and may have instructions stored therein which may cause the processor 152 to undertake various steps of example methods described herein. The central gateway module 150 may be configured to monitor various conditions described herein relating to usage of the seat belt 108 by the driver 106.

The central gateway module 150, as illustrated in FIG. 2, may be communicatively linked with a plurality of vehicle modules. The central gateway module 150 and other modules discussed herein may be separate entities, e.g., with different processors/memories, or may be integrated together and/or within other controllers or modules of the vehicle 100, including but not limited to a body control module, vehicle control module, powertrain control module, etc.

In the example illustrated in FIG. 2, the central gateway module 150 communicates with a fleet module 156, a telecommunications module 158, an experience management module 160, a driver monitoring system module 162, and a vehicle dynamics module 164 via a communication hub or network, e.g., an ethernet. The fleet module 156 may be configured to facilitate monitoring/control of the vehicle 100 by a fleet operator. The telecommunications module 158 may be configured to facilitate communication of the vehicle 100 and/or components thereof with external entities via an external communications network 500. Merely by way of example, the telecommunications module 158 may allow the fleet module 156 to communicate with a central office 1000 or service personnel of a fleet operator. Accordingly, the network 500 may include any network for communication without limitation, e.g., the internet, a cellular data network or other communication network, etc. As will be described further below, in some examples vehicle 100 may initiate a report or notification external of the vehicle 100, e.g., in response to elevated conditions, lack of seat belt use by driver of the vehicle 100 or other patterns of seat belt usage, etc. Accordingly, the vehicle 100 may communicate data externally of the vehicle 100 to the central office 1000. Data received from the vehicle 100 may be collected and/or stored at the central office 1000, e.g., for analysis and/or action by the central office 1000 or fleet operator. In some examples, data collected from vehicle 100 and/or other vehicles (not shown) may be used to initiate corrective measures, e.g., to encourage proper seat belt usage by driver(s) associated with the vehicle 100 and/or other vehicles. The experience management module 160 is in communication with one or more displays 161 of the vehicle 100, e.g., a center information display, a heads-up display, additional screens or displays, etc. The experience management module 160 may also be linked with speakers 163 of the vehicle 100. Accordingly, experience management module 160 may facilitate display of visual or audible warnings generated by the central gateway module and/or other modules of the vehicle 100. For example, as discussed further below, the experience management module 160 may provide notifications, such as audible or visual reminders/warnings to a driver to properly position and buckle the seat belt 108. In at least some examples, a seat belt warning may be persistent, i.e., it is activated in response to vehicle startup, and deactivated only after the central gateway module 150 determines that the driver seat belt 108 is properly secured. In some example cases, certain aspects of the persistent warning may expire or be deactivated after a predetermined period of time, e.g., with an audible warning being automatically deactivated after the predetermined period of time, and a visual warning continuing to persist (unless and until the driver seat belt 108 has been determined to be secured over the driver 106). In other cases, a visual and audible warning may both persist until the seat belt 108 is determined to be secured over the driver 106. The driver monitoring system 162 may be configured to monitor the driver 106 of the vehicle, e.g., with respect to proper positioning of the driver 106 within the cabin, attentiveness of the driver, or any other aspects that may be convenient. In the illustrated example, the driver monitoring system 162 is communicatively linked with the camera 124 at least to monitor positioning of the seat belt 108 on a shoulder of the driver 106.

The vehicle dynamics module 164 may be communicatively linked with a restraints control module 166 via a controller area network (CAN) 168 of the vehicle 100. The CAN 168 may generally facilitate communication of the vehicle dynamics module 164, restraints control module 166, and other controllers, electrical components, and/or subsystems (not shown) of the vehicle 100. The restraints control module 166 may be communicatively linked with the buckle switch/sensor 122, such that the restraints control module 166 is configured to provide information regarding whether/when the buckle 114 of the seat belt 108 is positively engaged with the catch 118.

The central gateway module 150 may be in communication with one or more sensor(s) of the vehicle 100, and thus may be configured to monitor conditions associated with determining usage of the seat belt 108. In the example illustrated in FIG. 2, the driver occupant detection switch (ODS) 120 is communicatively linked with the central gateway module 150. Additionally, to the extent the vehicle 100 includes a seat belt payout sensor 126, the sensor 126 may also be communicatively linked with the central gateway module 150. As noted above, the driver belt buckle switch 122 may be linked with the central gateway module 150 via the restraints control module 166, and the camera 124 may be linked with the central gateway module 150 via the driver monitoring system module 162.

Figure 3:
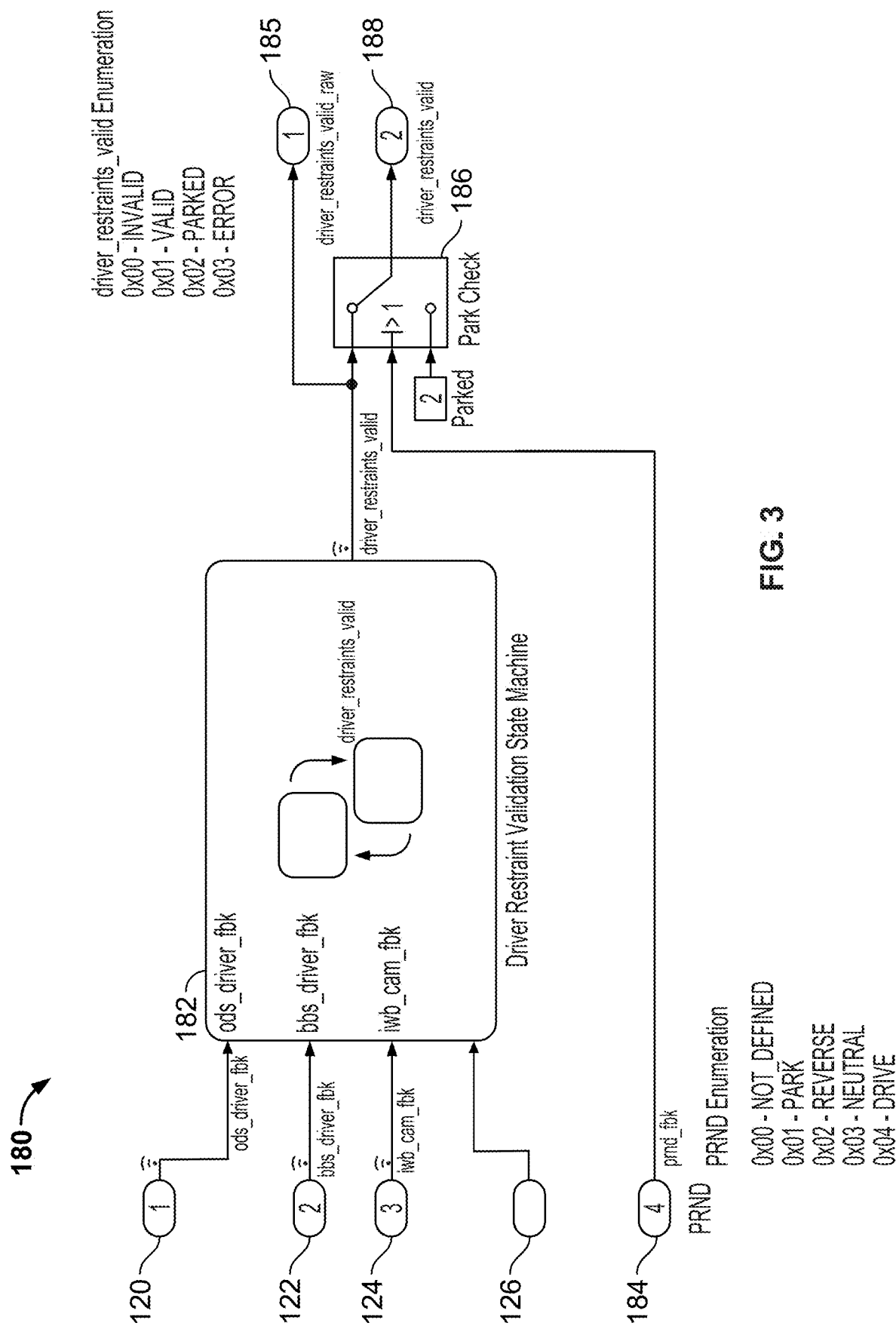
FIG. 3 shows a control methodology for the vehicle seat belt system of FIG. 2, in accordance with some embodiments of the present disclosure.

Turning now to FIG. 3, a control logic 180 is illustrated and described in further detail. The illustrated control logic 180 generally is configured to determine whether the driver seat belt 108 is properly positioned on the driver 106 and whether a vehicle feature and/or warning with respect to placement of the seat belt 108 should be enacted or disabled. The control logic 180 may be tangibly embodied in any one or more of the components of vehicle 100 illustrated in FIG. 2, e.g., central gateway module 150. The control logic 180 includes a driver restraint validation machine 182 which may output a raw yes/no signal based upon inputs from occupant detection switch 120, the buckle switch 122, and the camera 124. In examples where a seat belt payout sensor 126 is employed, the control logic 180 may also receive a signal from the sensor 126 as an additional input. The control logic 180 also monitors a vehicle transmission or directional control 184, e.g., a traditional "PRNDL," electronic transmission control, or the like. The directional control 184 may be a selective lever, button, touchscreen, or other user interface through which the driver 106 may place the vehicle 100 into a mode where the vehicle may be driven forward/backward or in neutral. Additionally, the directional control 184 may have a mode where the vehicle is "parked," e.g., with a transmission, vehicle motors, or the like prevented from allowing or imparting rotational movement to ground-engaging wheels of the vehicle 100.

Based upon the inputs from the one or more sensors of the vehicle 100 configured to monitor conditions related to the seat belt 108, the control logic 180 may initially determine whether the seat belt 108 is being worn appropriately by the driver 106 according to a defined seat belt criteria. In the illustrated example, the seat belt criteria is generally configured to determine whether the seat belt 108 is positioned over the lap and shoulder of the driver 106, with the buckle 114 engaged in the catch 118. To determine whether the seat belt criteria is met, the driver restraint validation state machine 182 may receive as inputs signals from each of the driver occupancy sensor 120, the buckle sensor 122, and the belt position sensor 124. In some examples, the driver restraint state machine 182 may also rely upon input from a belt payout sensor 126. The control logic 180 may output a "restraints valid" or "restraints invalid" signal to a decision block 186.

The decision block 186 may receive an input from the directional control 184 of the vehicle indicating a position thereof, in addition to output from the driver restraint validation state machine 182. The directional control 184 may indicate a driver intention to drive or move the vehicle, e.g., according to whether the directional control 184 has the vehicle 100 in a "park," "drive," "neutral," or "reverse" state or mode. The decision block 184, based upon the directional control 184 signal and the output from the driver restraint validation machine 182, may determine whether one or more vehicle features should be enabled or disabled, as will be discussed further below.

Figure 4:
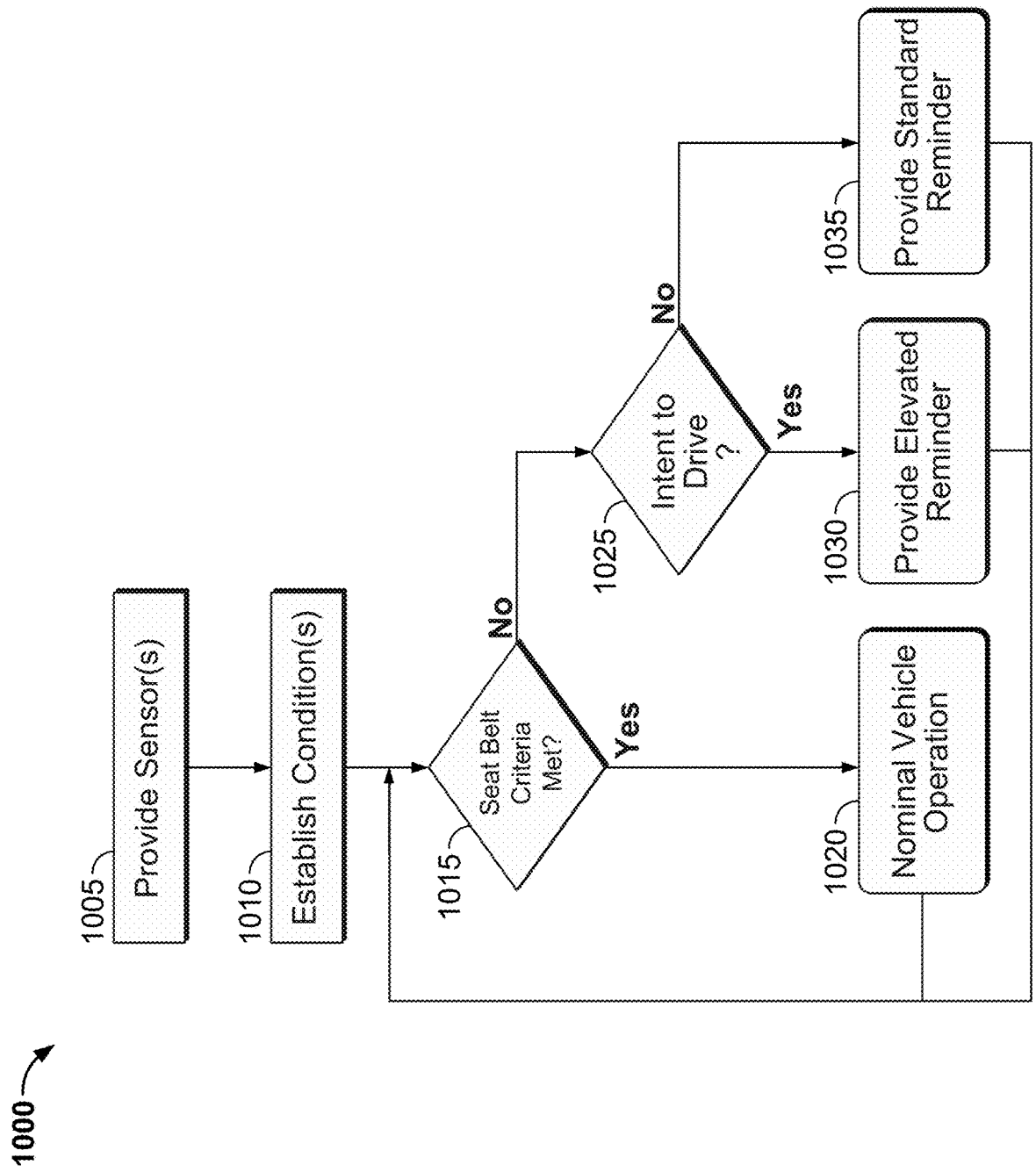
FIG. 4 shows a flowchart of an illustrative process for enabling one or more vehicle features in response to a determination that a driver is wearing their seat belt, in accordance with some embodiments of the present disclosure.

Turning now to FIG. 4, an example process 1000 for enabling vehicle features and/or deactivating notifications or reminders with respect to a vehicle seat belt is illustrated. Process 1000 may be implemented, e.g., by one or more modules of the vehicle 100 such as central gateway module 150 or a vehicle control module. Process 1000 or steps thereof may also be implemented remotely from the vehicle 100, e.g., by a central office in communication with vehicle 100. Process 1000 may begin at block 1005, where one or more sensors for monitoring seat belt conditions may be provided. Proceeding to block 1010, process 1000 may establish one or more vehicle features relating to seat belt usage by occupants of the vehicle, e.g., the driver. Process 1000 may then proceed to block 1015.

At block 1015, process 1000 may query whether the driver is belted properly. In some examples, a set of criteria including one or more conditions may be established for determining proper or correct usage of the seat belt by a vehicle driver. If each of the established conditions are met, process 1000 may determine that the seat belt is properly worn by the driver.

In a first example illustration, a set of conditions included in a seat belt criteria includes the vehicle driver occupying a driver seat of the vehicle, expiration of a minimum delay time after the vehicle driver is occupying the driver seat, an engagement of a driver's seat belt latch with a corresponding buckle after the expiration of the minimum delay time, and a positioning of a driver's seat belt on a shoulder of the vehicle driver. The minimum delay time may be on the order of a few seconds, e.g., as may be expected to occur between a time when driver 106 sits in the driver seat 102 and when the driver is able to buckle the seat belt 108 into the catch 118. The delay time may also prevent defeating the detection, e.g., by pre-buckling the seat belt 108. In this first example, if each of the conditions are met, process 1000 may determine that the seat belt 108 is being properly worn by the driver 106. On the other hand, if any one of the conditions are not met, e.g., the driver seat belt is not detected to be properly positioned on the shoulder of the driver 106, process 1000 may determine that the vehicle seat belt 108 is not positioned correctly.

In a second example illustration, a set of conditions included in a seat belt criteria includes the vehicle driver occupying a driver seat of the vehicle, expiration of a minimum delay time after the vehicle driver is occupying the driver seat, a payout of the seat belt from a retractor by a minimum amount, an engagement of a driver's seat belt latch with a corresponding buckle after the expiration of the minimum delay time, and a positioning of a driver's seat belt on a shoulder of the vehicle driver. Again, the minimum delay time may be on the order of a few seconds, e.g., as may be expected to occur between a time when driver 106 sits in the driver seat 102 and begins to withdraw the seat belt 108 from the retractor 112. The minimum payout may be a nominal amount, e.g., 200 millimeters (mm), or an amount indicative that the driver has withdrawn the seat belt 108 to a minimum extent needed to engage the buckle 114 with the catch 118. In another example, the minimum payout amount may correspond to a minimum amount needed to extend the seat belt 108 sufficiently to insert the buckle 114 into the catch 118, plus an additional amount corresponding to a length of seat belt 108 needed to pass around the body of a relatively small driver. In this example, if each of the conditions are met, process 1000 may determine that the seat belt 108 is being properly worn by the driver 106. On the other hand, if any one of the conditions are not met, e.g., the driver seat belt is not detected to be properly positioned on the shoulder of the driver 106, process 1000 may determine that the vehicle seat belt 108 is not positioned correctly.

Where process 1000 determines that the driver is properly belted at block 1015, process 1000 proceeds to block 1020. At block 1020, nominal vehicle operation continues. Accordingly, any warnings or reminders to buckle the driver's seat belt 108 may be disabled, and/or the vehicle may be driven. In examples where a vehicle is disabled from driving or warnings/reminders are implemented in response to situations where the driver is determined to be unbelted, at block 1020 vehicle features may be enabled, e.g., to deactivate a notification such as an audible or visible notification or reminder to buckle the driver's seat belt. Further, in some example approaches where a vehicle is prevented from driving in response to detection of a vehicle driver being unbelted, at block 1020 vehicle feature(s) may be enabled to permit nominal operation of the vehicle 100.

If, however, process 1000 determines that the vehicle/driver seat belt 108 is not properly positioned and buckled, process 1000 may proceed to block 1025. At block 1025, process 1000 may determine whether a driver of the vehicle 100 has an intent to move or drive the vehicle. Additionally, process 1000 may establish a baseline notification, e.g., a reminder or warning that is audible or displayed, e.g., via a heads-up display 161 of the vehicle 100, for the driver. The determination at block 1020 regarding belted status of the driver 106 may be determined relatively quickly after vehicle startup, e.g., within 500 milliseconds or the like, so as to provide a nearly-immediate reminder upon the driver 106 starting the vehicle 100. In an example, process 1000 may determine an intent to drive when a directional control 184 of the vehicle, shift lever, or the like is moved out of a "park" position or mode. For example, as noted above a driver restraint validation state machine may determine that an intent to drive is met when the directional control 184 is in any position other than "park." If process 1000 determines a driver intent to drive or move the vehicle 100, process 1000 may proceed to block 1030. Alternatively, if a driver intent is not established, process 1000 may proceed to block 1035.

At block 1035, process 1000 may enact a response to the determinations at blocks 1015 and 1025, respectively, that the driver is not properly belted and an intent of the driver to drive the vehicle is not evident. For example, process 1000 may display one or more reminders or warnings, e.g., that can be displayed via the displays 161, and/or played audibly via speaker(s) 163. Warnings/reminders initiated at block 1035 may be at a relatively reduced level or urgency, as an intent of the driver to move/drive the vehicle has not been determined. For example, this may occur if a driver is unbelted but not prepared to drive, e.g., due to acquiring an address for the vehicle 100 to drive to.

Alternatively, at block 1030 process 1000 may enact a response to the determinations at blocks 1015 and 1025, respectively, that the driver is not properly belted and there is a potential for the driver to attempt to drive the vehicle. Such response may be relatively elevated in urgency or intensity compared to warning(s) implemented at block 1035. For example, at block 1030 process 1000 may display multiple types of reminders or warnings, e.g., that can be displayed via the displays 161 and played audibly via speaker(s) 163. The heightened urgency or intensity may be needed as response to the detected likelihood of the vehicle being operated with an unbelted driver. Furthermore, in some example approaches process 1000 may prevent the vehicle from driving, e.g., by disabling motor(s) of the vehicle or the like. In still other examples, either alternatively or in addition to other actions taken, the occurrence of the driver 106 not wearing the seat belt 108 may be logged by the vehicle 100 or sent in a notification to an external destination, such as a fleet operator of vehicle 100.

Process 1000 may proceed from blocks 1020, 1030, and 1035 to block 1015, such that process 1000 runs generally continuously. Accordingly, process 1000 may continue to monitor for proper usage of the seat belt 108 by the driver 106.

Figure 5:
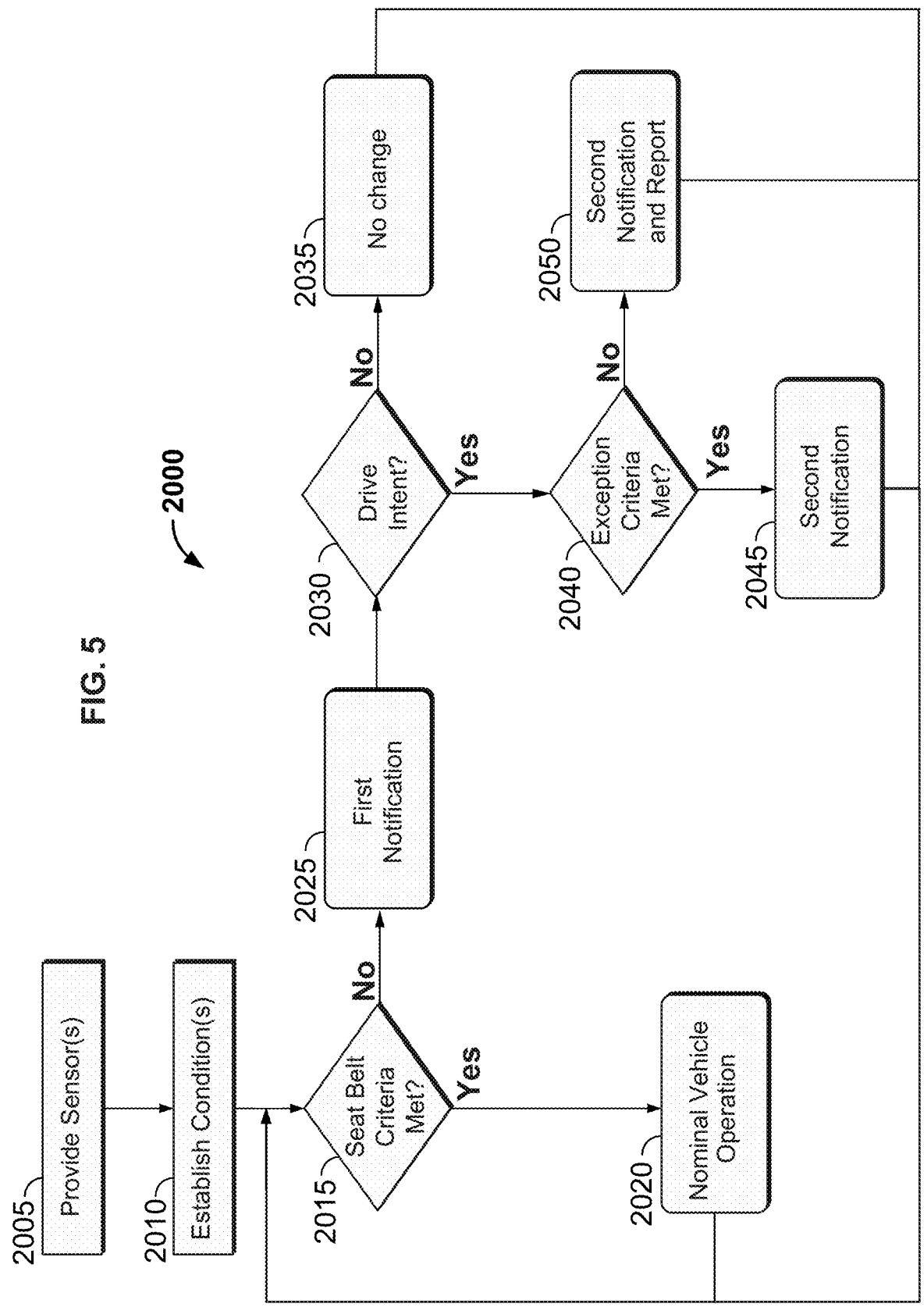
FIG. 5 shows a flowchart of another illustrative process for enabling one or more vehicle features in response to a determination that a driver is wearing their seat belt, in accordance with some embodiments of the present disclosure.

Turning now to FIG. 5, an example process 2000 for enabling vehicle features and/or deactivating notifications or reminders with respect to a vehicle seat belt is illustrated. Process 2000, as with process 1000, may be implemented by one or more modules of the vehicle 100 such as central gateway module 150 or a vehicle control module, merely as examples. Process 2000 or steps thereof may also be implemented remotely from the vehicle 100, e.g., by a central office in communication with vehicle 100.

Process 2000 may begin at block 2005, where one or more sensors for monitoring seat belt conditions may be provided. Proceeding to block 2010, process 2000 may establish one or more vehicle features relating to seat belt usage by occupants of the vehicle, e.g., the driver. Process 2000 may then proceed to block 2015.

At block 2015, process 2000 may query whether the driver is belted properly. In some examples, a set of criteria including one or more conditions may be established for determining proper or correct usage of the seat belt by a vehicle driver. If each of the established conditions are met, process 2000 may determine that the seat belt is properly worn by the driver. Process 2000 may use the same condition(s) as described above in process 1000 for determining whether a driver is properly belted, or any other condition(s) that are convenient.

Where process 2000 determines at block 2015 that one or more conditions are met to satisfy a seat belt criteria and/or that the driver is properly belted, process 2000 proceeds to block 2020. At block 2020, nominal vehicle operation continues. Accordingly, any warnings or reminders to buckle the driver's seat belt 108 may be disabled, and/or the vehicle may be driven. In examples where a vehicle is disabled from driving or warnings/reminders are implemented in response to situations where the driver is determined to be unbelted, at block 2020 vehicle features may be enabled, e.g., to deactivate a notification such as an audible or visible notification or reminder to buckle the driver's seat belt. Further, in some example approaches where a vehicle is prevented from driving in response to detection of a vehicle driver being unbelted, at block 2020 vehicle feature(s) may be enabled to permit nominal operation of the vehicle 100. Process 2000 may then proceed to block 2015, thereby continuing to monitor for appropriate seat belt usage.

If, however, process 2000 determines at block 2015 that the vehicle/driver seat belt 108 is not properly positioned and buckled, process 2000 may proceed to block 2025. At block 2025, process 2000 may enact a response to the determination at block 2015 that the driver is not properly belted. In the illustrated example, process 2000 provides a first notification, e.g., to remind the driver to buckle the seatbelt. For example, the vehicle 100 may display one or more reminders or warnings, e.g., that can be displayed via the displays 161, and/or played audibly via speaker(s) 163. Warnings/reminders initiated at block 2025 may be at a relatively reduced level or urgency in relation to subsequent reminders or other actions, as an initial step in reminding the driver to buckle their seatbelt. Process 2000 may then proceed to block 2030.

At block 2030, process 2000 may determine whether a driver of the vehicle 100 has an intent to move or drive the vehicle. In an example, process 2000 may determine an intent to drive when a directional control 184 of the vehicle, shift lever, or the like is moved out of a "park" position or mode. For example, as noted above a driver restraint validation state machine may determine that an intent to drive is met when the directional control 184 is in any position other than "park." If a driver intent is not established, process 2000 may proceed to block 2035, in which no change to the first notification is initiated. In other words, the first notification may persist. In an example, the first notification may persist continuously in an effort to remind the driver to buckle their seatbelt as they prepare the drive the vehicle 100 (e.g., while the driver is sitting in the vehicle determining an address or destination before driving). In another example, the first notification persists for a predetermined reminder warning time, e.g., the display and/or audible notifications persist for 30 seconds. Process 2000 may then proceed back to block 2015, such that the process 2000 continues to monitor conditions to determine proper belting of the driver, e.g., by proceeding to determine whether seat belt criteria are met at block 2015.

Alternatively, if a drive intent is established at block 2030, process 2000 may proceed to block 2040 to determine whether an exception criteria is met. Exception criteria may be used to avoid further notifications and/or escalation of notifications or other actions, e.g., as described further below in block 2050. For example, vehicle 100 may determine that mitigating circumstances exist, e.g., the vehicle 100 is driving an extremely short distance or not on public roads (e.g., to a delivery site within 100 feet in same residential neighborhood, across a parking lot from current location, etc.). Other exception criteria may include the vehicle 100 being under a certain speed (e.g., under 15 mph), traveling along a certain route, employed in a certain position, stopping at a certain interval, or if the driver is leaving the driver seat at a certain interval. If sufficient mitigating factors exist or it is otherwise not desired to escalate warnings or undertake punitive action with respect to a driver of the vehicle 100, process 2000 may proceed to block 2045 where a second notification may be initiated. For example, a same warning/notification(s) provided to the driver at block 2025 may be repeated, to the extent the first notification at block 2025 has expired, or maintained. In another example, a relatively elevated warning or notification (e.g., a different type of notification, a limitation on vehicle usage, and/or a notification that is louder, larger, or otherwise more intrusive in comparison to the notification initiated at block 2025) may be initiated.

If process 2000 determines at block 2040 that an exception criteria is not met, process 2000 may proceed to block 2050, where a second notification is initiated and a report may also be initiated. The second notification initiated at block 2050 may, in at least some examples, be more intrusive or significant in comparison to the second notification of block 2045, and/or may notify the driver that a report external to the vehicle 100 is being sent. In addition to the second notification, a report external of the vehicle may be initiated. Merely as examples, vehicle 100 may initiate a report to a central office, dispatch, fleet operator, insurer of the vehicle 100/driver, etc. noting the seat belt usage (or lack thereof) by the driver of the vehicle 100. In this manner, driver behavior with respect to seat belt usage may be tracked and/or addressed.

Process 2000 may proceed from blocks 2045 and 2050 (and as noted above, from blocks 2020 and 2035), to block 2015, such that process 2000 runs generally continuously to monitor for proper usage of the seat belt 108 by the driver 106.

The example methods and systems herein may generally facilitate enhanced usage of seat belts by vehicle drivers, as may be particularly useful for operators of vehicle fleets that wish to encourage seat belt usage. More particularly, example approaches herein are relatively difficult to defeat, e.g., by buckling the seat belt behind the driver. At a minimum, attempts to defeat the system are made more tedious and less comfortable than simply buckling the seat belt properly, resulting in greater usage. Additionally, while this feature may be advantageous in the context of a vehicle fleet, e.g., of commercial vehicles, example illustrations herein may also be employed in the context of personal use, e.g., for parents or guardians who wish to enforce seat belt usage by other drivers.

The foregoing description includes exemplary embodiments in accordance with the present disclosure. These examples are provided for purposes of illustration only, and not for purposes of limitation. It will be understood that the present disclosure may be implemented in forms different from those explicitly described and depicted herein and that various modifications, optimizations, and variations may be implemented by a person of ordinary skill in the present art, consistent with the following claims.

What is claimed is:

1. A method, comprising:
   determining that a driver has occupied a driver seat of a vehicle;
   enabling a first vehicle feature upon determining that a seat belt criteria is met based upon a detection of each of a set of conditions, the set of conditions including:
   expiration of a delay time after the vehicle driver occupies the driver seat;
   an engagement of a driver's seat belt latch after the expiration of the delay time; and
   a positioning of a driver's seat belt on a shoulder of the vehicle driver.

2. The method of claim 1, wherein enabling the first vehicle feature includes deactivating a first notification, wherein the notification persists if the vehicle driver does not meet the seat belt criteria.

3. The method of claim 1, wherein enabling the first vehicle feature includes enabling driving of the vehicle, wherein driving of the vehicle is disabled if the vehicle driver does not meet the seat belt criteria.

4. The method of claim 1, further comprising:
   determining a vehicle drive intent of the vehicle driver.

5. The method of claim 4, further comprising enabling a second vehicle feature based upon the determining of the vehicle drive intent and the determining that the vehicle driver meets the seat belt criteria.

6. The method of claim 5, wherein enabling the first vehicle feature includes deactivating a visible driver notification, and enabling the second vehicle feature includes deactivating an audible notification.

7. The method of claim 4, further comprising determining whether an exception criteria is met.

8. The method of claim 7, further comprising initiating a report external of the vehicle when the exception criteria is not met, wherein the report external of the vehicle is not initiated when the exception criteria is met.

9. The method of claim 4, wherein the vehicle drive intent is determined by a change of a vehicle operating mode from a park mode.

10. The method of claim 1, wherein the set of conditions determining that the seat belt criteria is met further comprises determining the driver seat belt of the vehicle has been deployed by a predetermined minimum distance.

11. A method, comprising:
    determining that a driver has occupied a driver seat of a vehicle;
    deactivating a notification upon determining that a seat belt criteria is met based upon a detection of each of a set of conditions, the set of conditions including:
    expiration of a delay time after the vehicle driver occupies the driver seat, and
    an engagement of a driver's seat belt latch after the expiration of the delay time; and
    a positioning of a driver's seat belt on a shoulder of the vehicle driver;
    wherein the notification persists if the vehicle driver does not meet the seat belt criteria.

12. A vehicle system, comprising:
    a driver seat occupancy sensor;
    a driver seat belt engagement sensor;
    a driver seat belt shoulder position sensor; and
    a controller in communication with the driver seat occupancy sensor, the driver seat belt engagement sensor, and the driver seat belt shoulder position sensor, the controller configured to determine whether a vehicle driver meets a seat belt criteria based upon a detection of each of a set of seat belt conditions, the set of conditions including:
    the driver seat occupancy sensor detecting the vehicle driver occupying a driver seat of the vehicle;
    expiration of a minimum delay time after the vehicle driver is occupying the driver seat;
    the driver seat belt engagement sensor detecting an engagement of a driver's seat belt latch with a corresponding buckle after the expiration of the minimum delay time; and
    the driver seat belt shoulder position sensor detecting a positioning of a driver's seat belt on a shoulder of the vehicle driver,
    wherein the controller is configured to enable a first vehicle feature if the vehicle driver meets the seat belt criteria, and wherein the controller is configured to disable the first vehicle feature if the vehicle driver does not meet the seat belt criteria.

13. The system of claim 12, wherein the first vehicle feature is a notification, wherein the notification persists if the vehicle driver does not meet the seat belt criteria.

14. The system of claim 12, wherein enabling the first vehicle feature includes enabling driving of the vehicle, wherein driving of the vehicle is disabled if the vehicle driver does not meet the seat belt criteria.

15. The system of claim 12, wherein the controller is configured to determine a vehicle drive intent of the vehicle driver.

16. The system of claim 15, wherein the controller is configured to enable a second vehicle feature based upon the vehicle drive intent.

17. The system of claim 16, wherein the first vehicle feature includes a deactivation of a visible driver notification, and wherein the second vehicle feature includes a deactivation of an audible notification.

18. The system of claim 15, wherein the controller is configured to determine whether an exception criteria is met, wherein the controller initiates a report external of the vehicle when the exception criteria is not met, and wherein controller does not initiate the report external of the vehicle when the exception criteria is met.

19. The system of claim 12, wherein the controller is configured to determine a driver seat belt of the vehicle has been deployed by a predetermined minimum distance; and
   wherein the seat belt criteria further includes a detection that the seat belt of the vehicle has been deployed by the predetermined minimum distance.

20. The system of claim 12, wherein the driver seat belt shoulder position sensor includes a camera.

* * * * *